Figure 1:
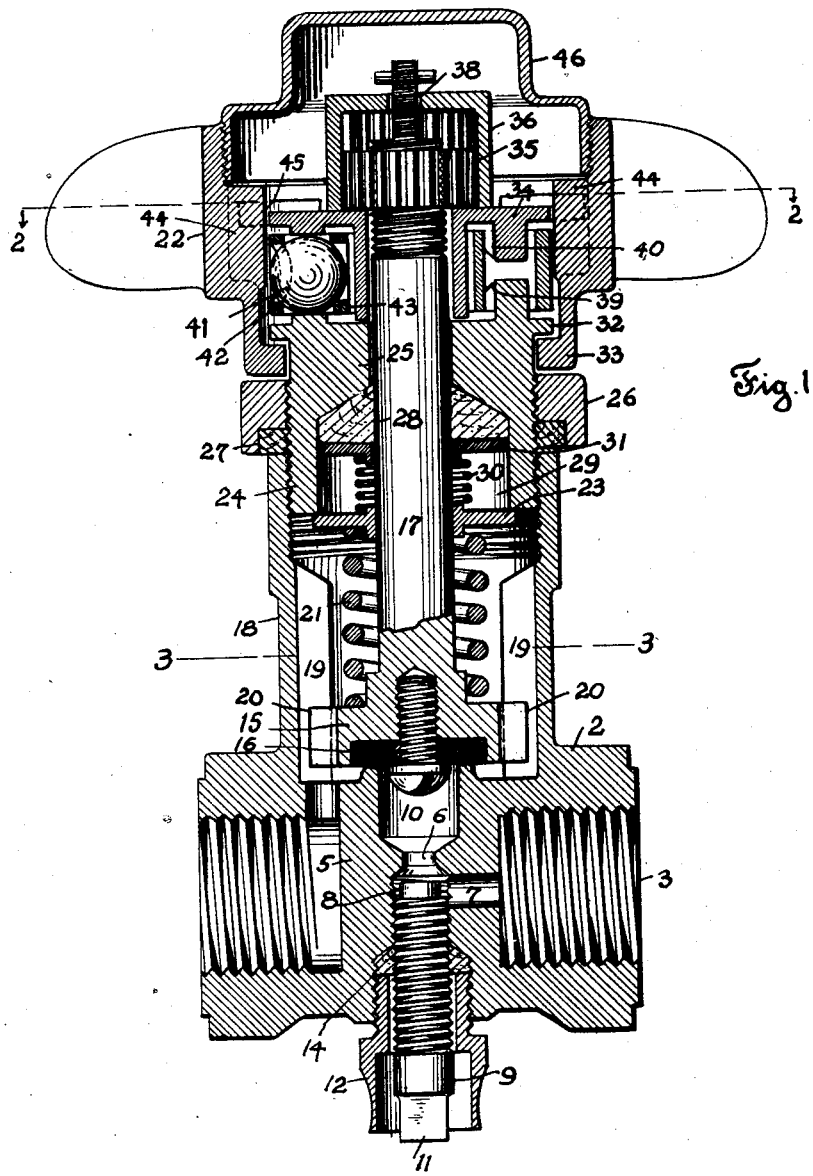

June 5, 1928.
H. W. TAYLOR
SELF CLOSING VALVE
Filed July 19, 1926    2 Sheets-Sheet 2
1,672,235
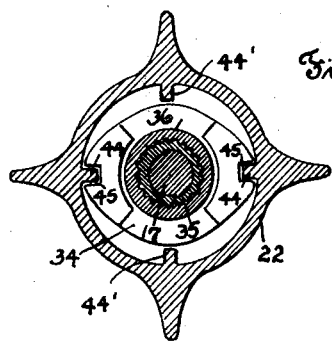
Fig. 2
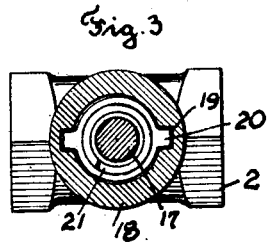
Fig. 3
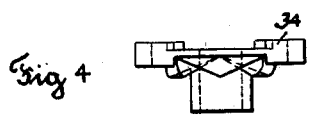
Fig. 4
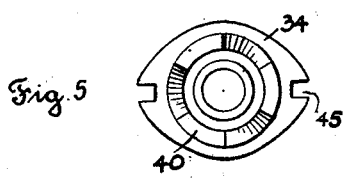
Fig. 5
Fig. 6
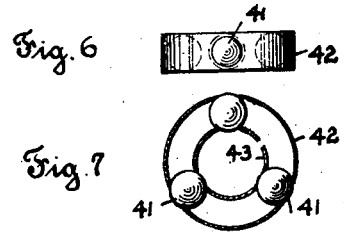
Fig. 7
Fig. 8
Fig. 9
Fig. 10
Fig. 11
Fig. 12
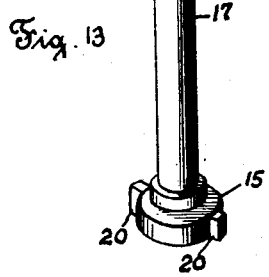
Fig. 13
Inventor
H. W. Taylor
By _____
Attorney Patented June 5, 1928.

1,672,235

UNITED STATES PATENT OFFICE.

HALSEY W. TAYLOR, OF WARREN, OHIO.

SELF-CLOSING VALVE.

Application filed July 19, 1926. Serial No. 123,296.

My invention relates to an improvement in self-closing valves, and in general my object is to provide a valve which may be readily controlled by hand to promote the discharge of water in a steady stream in a drinking fountain. As constructed, the valve embodies a spring-pressed closure member having a stem adapted to be raised by ball bearing devices upon rotation of a handle, and the operating connection between the handle and valve stem is such that the handle may be rotated easily without rising with the stem. Furthermore, the operating connections are locked to the valve stem in a simple way to permit vertical adjustment of the valve stem and proper seating of the valve member without excessive loose play between the working parts. However, such parts are particularly constructed to permit convenient assembly and disassembly thereof, including the balls which are held removably in a single spring ring retainer, all as hereinafter shown and described in greater detail and more particularly pointed out in the claims.

In the accompanying drawing, Fig. 1 is a sectional view, on a large scale, of my improved self-closing valve. Fig. 2 is a horizontal section of the valve stem and handle on line 2—2 of Fig. 1. Fig. 3 is a horizontal section of the neck of the valve body on line 3—3, of Fig. 1. Fig. 4 is a side view, and Fig. 5, a bottom view of the rotatable cam member which is removably confined within the handle. Fig. 6 is a side elevation, and Fig. 7 a sectional view, of the balls and ball separator for supporting the rotatable cam member. Fig. 8 is a top view, and Fig. 9 a side elevation, of the cam nut which is fixed within the top of the valve body. Fig. 10 is a sectional view and Fig. 11 a bottom view, of the locking cap for the valve stem. Fig. 12 is a perspective view of the locking collar, and Fig. 13 a perspective view of the main valve member and its stem.

My invention comprises a valve body 2, which is provided with a main water passage which is divided into two parts by a central wall or diaphragm 5 having a valve seat 6 at its top. A small water passage 7 leads from passage 3 to a screw-threaded bore 8 in which a regulating screw 9 is secured axially in line with a vertical opening or passage 10 of restricted size in wall 5 and through which the water must pass to escape when the valve is opened. The squared extremity 11 of screw 9 is exposed at the bottom of the valve body for wrench adjustment, and a cupped gland member 12 is sleeved around the screw and screw-connected with body 2 to permit suitable packing 14 to be compressed around the screw-threaded part of the stem, thereby preventing leakage.

The main valve member comprises a head 15 having a compressible seating disk 16 at its bottom and a round smooth stem 17 at its upper side which extends upwardly through a cylindrical neck 18 on body 2. Vertical grooves 19 are formed internally of the cylindrical neck to permit correspondingly situated lugs 20 on head 15 to slide therein when the valve stem is raised and head 15 is lifted from seat 6, thus preventing rotation of said head and stem. The upward movement of this valve member compresses a heavy coiled spring 21 seated upon head 15, which spring thus serves to close the valve when the rotatable handle 22 which serves to operate the lift mechanism for the valve stem is released. Spring 21 bears at its upper end against a plate 23 which is sleeved upon stem 17, and this plate is held by the pressure of the spring against the bottom edge of screw-threaded wall 24 of a cam plug 25, which is adjustably screwed within the top of cylindrical neck 18 of body 2. Downward adjustment of plug 25 will compress the spring and provide additional tension or pressure in valve head 15 when needed, and a lock nut 26 encircles plug 25 to prevent the cam plug from turning after adjustment thereof. A sealing gasket 27 may be used between lock nut 26 and the upper edge of neck 18 to prevent leakage where the parts are screw-threaded together. Leakage internally of cam plug 25 is prevented by packing 28 embracing round stem 17 within a chamber 29 in the bottom of the plug, which packing is held constantly under compression by a small coiled spring 30 seated between plate 23 and a flanged disk 31 which presses against the packing.

Handle 22 is a hollow body having rotatable connection with cam plug 25, the latter having an annular flange 32 at its top which overlaps an inwardly-extending flange 33 at the bottom of the handle. Consequently said handle cannot rise, being confined between flange 32 and lock nut 26, although freely rotatable. The parts which rise when the handle is rotated comprise valve stem 17, and a cam member 34 which is sleeved loosely over the upper end of the valve stem but locked against independent lift movement in respect thereto by a locking collar 35 and a locking cap 36 for said collar. Collar 35 has screw-threaded engagement with the upper screw-threaded end of stem 17 to permit adjustment of the stem and its valve head in respect to valve seat 6, and the top of stem 17 is faced off flat on opposite sides to provide a flat-faced locking extremity 37 for cap 36, which cap is serrated internally to interlock with the serrated circumference of collar 35. Cross-shaped slots 38 are provided in the top wall of cap 36 to permit attachment of the cap to stem extremity 37, the crossed slots varying slightly from a right angle to facilitate adjustment of the parts. Cap 36 is sleeved upon and interlocked with collar 35 only after said collar has been screwed down upon the stem into loose engagement with the top of rotatable cam member 34, and in this position of the parts said cam member may be rotated and caused to ride upwardly against the bottom of collar 35 to lift valve stem 17. The means for lifting the stem comprises opposed cams or reversely-inclined surfaces 39—40 on nut 25 and member 34, together with a plural number of steel balls 41 interposed between said surfaces. These balls are supported for joint movement by a circular ball retainer comprising two concentric metal bands or rings 42 and 43 made of flat stock having round openings radially thereof to receive and hold the balls, and the inner ring 43 is preferably a split ring possessing spring qualities to permit convenient assembly of such parts and to secure the balls under tension within the outer endless ring. Thus, when the balls and their common retainer are confined between the cam surfaces a common movement will be imparted to the balls when handle 22 is rotated, the rotative movement being transmitted to cam member 34 by a pair of vertical ribs 44 which are located internally of handle 22 and extend into slots 45 in the edge of cam member 34, see Figs. 1 and 2. During such rotation of the parts a sliding contact is established between cam member 34 and handle 22 at ribs 44, which permits said cam member to rise freely within the handle while the latter is prevented from rising by flanges 32 and 33. Additional ribs 44' may be used inside of the handle to permit convenient assembly and adjustment of the handle in respect to the body, the handle also having a removable crown member 46 to enclose the working parts. Crown member 46 may be screw-connected to handle 22 and bear any desired inscription, and it may be made of metal, porcelain or other material.

The valve is held closed normally by its main spring, and to open the valve, handle 22 may be rotated in either direction, thereby rotating cam member 34 and causing the same to ride upon the balls, which in turn roll upwardly on the cam surfaces on plug 25, thus raising cam member 34 and the valve stem also by means of collar 35. In so doing the valve head is raised from its seat and the lugs on the valve head prevent its rotation. The main spring is constantly under tension but is further compressed in opening the valve so that when the handle is released self-closing of the main water passage will be effected. Control of the water flowing through the valve and a steady uniform flow of water at any desired radial setting of the valve handle may be easily maintained because the handle may be rotated freely without rising and also because the action of the main spring may be steadily controlled. Such control is especially desirable in a drinking fountain where a steady stream of water of uniform height or volume must be temporarily maintained by hand while the person is drinking, and for which purpose the present invention has been particularly designed, although not necessarily limited to this particular class of water distributing devices.

What I claim is:

1. A self-closing valve, comprising a non-rotatable lift stem, cam devices sleeved over and freely encircling said stem adapted to lift said stem, and a rotatable non-rising handle centrally aligned with said lift stem, said cam devices having a vertically slidable operating connection with said handle.

2. A self-closing valve, comprising a spring-pressed lift stem, cam devices adapted to lift said stem, a hollow handle having vertical ribs internally slidably engaged with said cam devices adapted to effect joint rotatable movement of said parts and an independent vertical lift movement of said cam devices in respect to said handle.

3. A self-closing valve, comprising a spring-pressed valve stem, means interlocked with said stem and a cam member engaged with said means adapted to lift the stem, and a rotatable handle, said cam member and handle having vertically-slidable engaging portions adapted to permit joint rotatable movement thereof and an independent vertical movement of said cam member.

4. A self-closing valve, comprising a body having a cylindrical neck and a valve seat, a valve member having lugs slidably engaging said neck adapted to prevent said member from turning, a lift stem for said valve member having a screw-threaded end and a flat extension, a serrated collar screw-connected with said stem, a slotted cap detachably engaged with said extension having serrations adapted to interlock with said serrated collar, a cam member rotatably sleeved upon said stem in lift relation to said collar, a cam nut connected with said cylindrical neck adapted to support said stem, a compression spring within said neck adapted to seat said valve member, balls between said cam member and nut, and a handle rotatably connected to said nut having driving lugs in slidable engagement with said cam member.

5. A self-closing valve, comprising a valve member having a lift stem, a lifting cam member sleeved upon said stem having notches therein, and a hollow handle having vertical ribs internally thereof extending into said notches to rotate said cam member and to permit vertical movement thereof within said handle.

6. A self-closing valve, comprising a body having a hollow cylindrical extension grooved internally, a valve head having lugs slidable vertically within the grooves in said extension, a compression spring seated upon said head, a nut having a cam surface at its top secured to said extension, a stem for said valve head extending through said cam nut, a lock nut for said cam nut, a rotatable handle having a flanged base portion sleeved upon said cam nut, means on said nut adapted to prevent a lift movement of said handle, a cam member sleeved upon said valve stem having notches, balls between said cam member and cam nut, ribs upon said handle extending into said notches, a collar adjustably secured upon said valve stem adapted to be engaged by said cam member, and a device for locking said collar against rotation upon said stem.

7. A self-closing valve, comprising a body having a cylindrical extension, a valve member having a lift stem, a plug in screw connection with said extension having a central opening for said stem and a recess in its bottom, a plate sleeved upon said stem adapted to bear upwardly against the bottom of said plug, a compression spring seated upon said valve member adapted to press against said plate, a spring within said recess seated upon said plate, and a gland member and packing within said recess subjected to constant compresison of said second spring.

8. A self-closing valve, comprising a valve member having a lift stem provided with a flat extension at its upper end, and lift mechanism for said valve member comprising a serrated collar screwed upon said stem, and a locking cap having interlocking serrations for said serrated collar and formed with a slot adapted to receive said flat extension.

9. A self-closing valve, comprising a valve member having a lift stem provided with a reduced flat extension, a lift collar in screw-connection with said stem having a serrated circumference, and a locking cap having serrations to interlock with said serrated circumference and provided with a cross-shaped slot adapted to sleeve over said flat extension, the cross portion of said slot being approximately but not exactly at right angles.

10. A self-closing valve, comprising a valve member having a lift stem and cam devices and a handle adapted to raise said stem, including a set of balls, and a retainer and separator for said balls, comprising two independent concentric rings having openings for the balls.

11. A self-closing valve, comprising a valve member having a lift stem and cam devices and a handle adapted to raise said stem, including a set of balls, and a retainer and separator for said balls, comprising two independent concentric rings having openings for the balls, one of said rings being split and possessing spring qualities.

12. A self-closing valve, comprising a body having a main water passage divided by a wall having a valve seat at its top and a screw-threaded opening in its lower portion and a water restricting passage between said seat and opening, a regulating screw within said opening opposite said restricting passage, packing and a packing gland in the bottom of said body for said regulating screw, and a spring pressed non-rotatable valve member seated normally upon said valve seat having a rotatable non-rising handle and lift means enclosed by and associated with said handle adapted to raise said valve and open said main and restricted passages.

In testimony whereof I affix my signature.

HALSEY W. TAYLOR.